United States Patent [19]

Kondo et al.

[11] Patent Number: 4,815,633

[45] Date of Patent: Mar. 28, 1989

[54] AUTOMATIC COFFEE VENDING MACHINE BEING ABLE TO SERVE A STRAIGHT COFFEE AND A BLENDED COFFEE SELECTIVELY

[75] Inventors: Ryohei Kondo; Ikuo Harashima; Daigo Sunouchi, all of Gunma, Japan

[73] Assignee: Sanden Corporation, Gunma, Japan

[21] Appl. No.: 839,824

[22] Filed: Mar. 13, 1986

Related U.S. Application Data

[63] Continuation of Ser. No. 596,244, Apr. 2, 1984, abandoned.

[30] Foreign Application Priority Data

Apr. 5, 1983 [JP] Japan ................................ 58-58730

[51] Int. Cl.[4] ...................... A47J 31/24; A47J 31/40; A47J 31/42
[52] U.S. Cl. ............................. 222/129.4; 99/286; 99/289 R; 221/96
[58] Field of Search ........................................ 221/96; 222/129.1-129.4, 146.5; 99/286, 289 R

[56] References Cited

U.S. PATENT DOCUMENTS 3,991,911 11/1976 Shannon et al. ............. 222/129.4 X Primary Examiner—F. J. Bartuska
Attorney, Agent, or Firm—Hopgood, Calimafde, Kalil, Blaustein & Judlowe

[57] ABSTRACT

Automatic regular coffee vending machine including ground coffee powders or coffee beans of different varieties stored in different chambers, separately. When one or more varieties are selected by selection-key operation, coffee powder or powders of the selected variety or varieties are supplied by a predetermined amount into a coffee extractor together with hot water of a predetermined amount, so that a cup of straight coffee of the selected variety or a cup of blended coffee of the selected varieties can be served from the machine. The coffee concentration can be selected by operation of concentration-selection keys, and coffee with cream and/or sugar also can be obtained by cream and/or sugar selection keys which are controlled by a memory storing data on the various supply amounts. When coffee beans are stored in the chambers, the selected amounts of beans are ground in a coffee mill before delivery to the coffee extractor.

6 Claims, 8 Drawing Sheets

AUTOMATIC COFFEE VENDING MACHINE BEING ABLE TO SERVE A STRAIGHT COFFEE AND A BLENDED COFFEE SELECTIVELY

This application is a continuation of application Ser. No. 596,244, filed Apr. 3, 1984 now abandoned.

BACKGROUND OF THE INVENTION

1. Field of the Invention

This invention relates to automatic coffee vending machines, and in particular, to such machines for vending regular coffee which serves coffee brewed or extracted by pouring hot water to ground coffee powder in response to a vending request by a purchaser.

2. Description of the Prior Art

A vending machine has been well known and used in the prior art wherein instant coffee, tea and/or cocoa powders are stored in respective canister and are selectively supplied by a predetermined amount into a cup together with hot wwater in response to a purchaser's request to serve a desired coffee, tea or cocoa.

An automatic vending machine for regular coffee has also been known wherein ground coffee powder is stored in a canister and is supplied by a predetermined amount to a coffee extractor together with hot water in response to a vending request to serve a regular coffee.

In a certain type of such a regular coffee vending machine, coffee beans are stored in a canister and a predetermined amount of coffee beans is ground by a coffee mill at a vending operation.

In various known coffee vending machines, only one powder can be selected from different kinds of powders or beans contained in canisters at one vending request.

However, if various varieties straight coffees and various blended coffees are selectively available from a vending machine, the vending machine would be quite convenient for purchasers.

SUMMARY OF THE INVENTION

It is an object of this invention to provide an automatic vending machine wherein different varieites of ground coffee powders or of coffee beans are stored separately and a straight coffee of any one of the varieties and a blended coffee of any combination of the varaties can be served as requested.

It is another object of this invention to provide such an automatic vending machine wherein coffee concentration can be selected as desired.

It is still another object of this invention to provide such an automatic vending machine wherein cream and/or sugar can be mixed to the coffee as desired.

According to this invention, an automatic coffee vending machine can be obtained which comprises a plurality of chambers for storing coffee materials of different varieties, respectively, and a plurality of means for discharging the coffee materials from the plurality of chambers, respectively. Powders of the coffee materials discharged by the discharging means are introduced into a coffee extractor by an introducing means. Hot water is also supplied to the extractor from a hot water supply means. The automatic coffee vending machine further comprises money detecting means for generating a vending signal at a time when an amount of money as deposited by a purchaser is equal to or above a predeterminaed price, and selection key means for selecting desirable one or more coffee variations contained in the plurality of chambers. Electric control means is actuated by the vending signal from the money detection means and control the coffee extracting means, the coffee discharging means and the hot water supply means so as to serve a straight coffee of the desired one variety or a blended coffee of the desired more than one varieties as selected by the selection key means.

In the plurality of chambers, ground coffee powders or coffee beans may be stored. In storing coffee beans, the machine further comprises a coffee mill means for grinding beans discharged by the discharging means. The coffee mill means also operates under control of the electric control means.

According to this invention, the vending machine further comprises a sugar container, a cream container and cream and sugar discharging means. Cream and sugar discharging means operate under control of the electric control means to supply cream and sugar to coffee extracted by the coffee extracting means.

In an aspect of this invention, the automatic coffee vending machine comprises coffee concentration key means for selecting a desirable coffee concentration level, sugar amount key means for selecting a desirable sugar amount and cream amount key means for selecting a desirable cream amount. Memory means stores data of various cream amounts, various sugar amounts, different supply amounts of coffee material, and supply amount ratios of the different coffee varieties contained in the chamberss. The electric control means reads out the data and controls the coffee material discharging means, the cream discharge means and the sugar discharge means to serve a coffee with a concentration, sugar amount and cream amount as selected by the coffee concentration key means, the cream amount key means and the sugar amount key means.

Further objects, features and other objects of this invention will be understood from the following detailed description of preferred embodiments referring to the accompanying drawings.

DETAILED DESCRIPTION OF PREFERRED EMBODIMENTS

Figure 1:
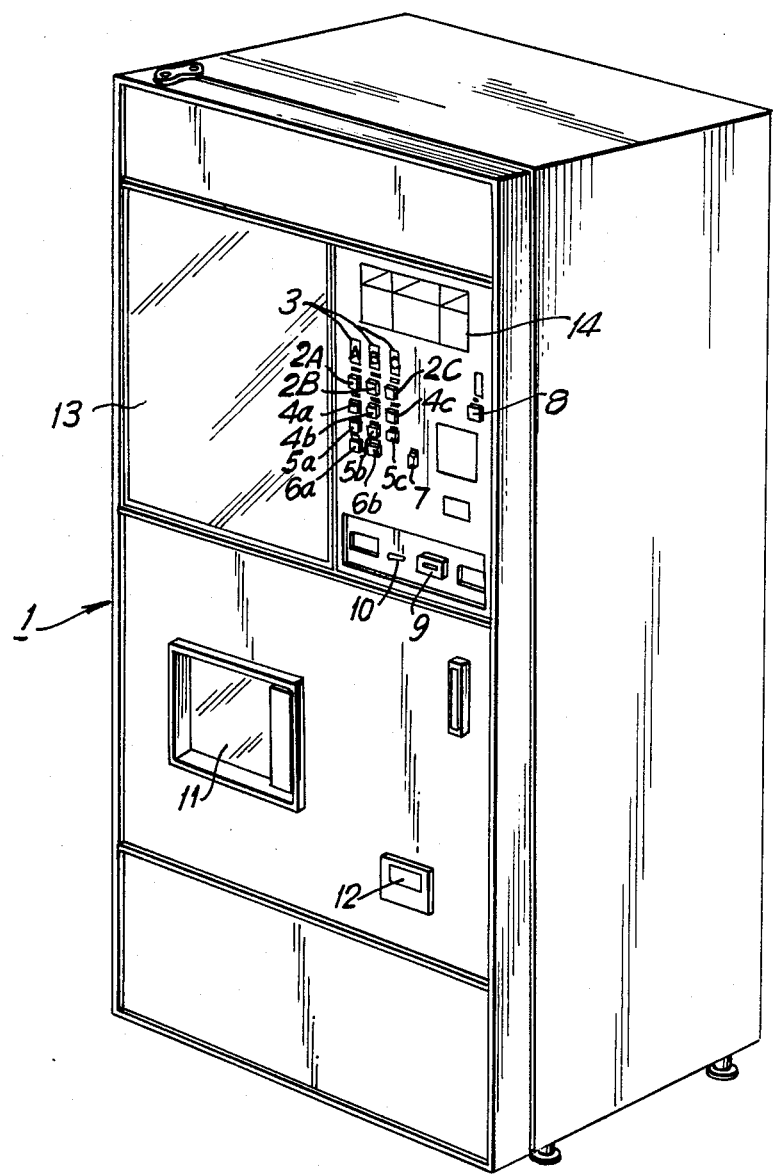
FIG. 1 is a perspective view of an embodiment of this invention.

Referring to FIG. 1, a regular coffee vending machine 1 shown therein has selection keys 2 for selecting desirable coffee varieties and indicator windows 3 for indicating available coffee varieties in the machine front face. In this embodiment, three varieties of coffee are sold and are represented by A, B and C, respectively. The machine front face is also provided with sugar selection keys 4a–4c for selecting the sugar amount to be added in three steps, large, medium and small, cream selection keys 5a–5c for selecting the cream amount to be added in three similar steps, coffee concentration selection keys 6a and 6b for selecting coffee concentration in two steps, strong or heavy and light, a clear key 7 for cancelling prior selections by those selection keys, and a start key 8 for starting the vending operation of the machine. Start key 8 should be pushed after all of the selections have been made.

Similarly with conventional automatic vending machines, a coin depositing inlet 9, a con return lever 10, an article access or delivery opening 11 for hot coffee, a coin return gate 12, an advertisement panel 13 are attached to the machine front face. Furthermore, the machine front face is provided with a window 14 through which coffee materials stored can be seen from the exterior so that a purchaser can view the available coffee materials.

Figure 2:
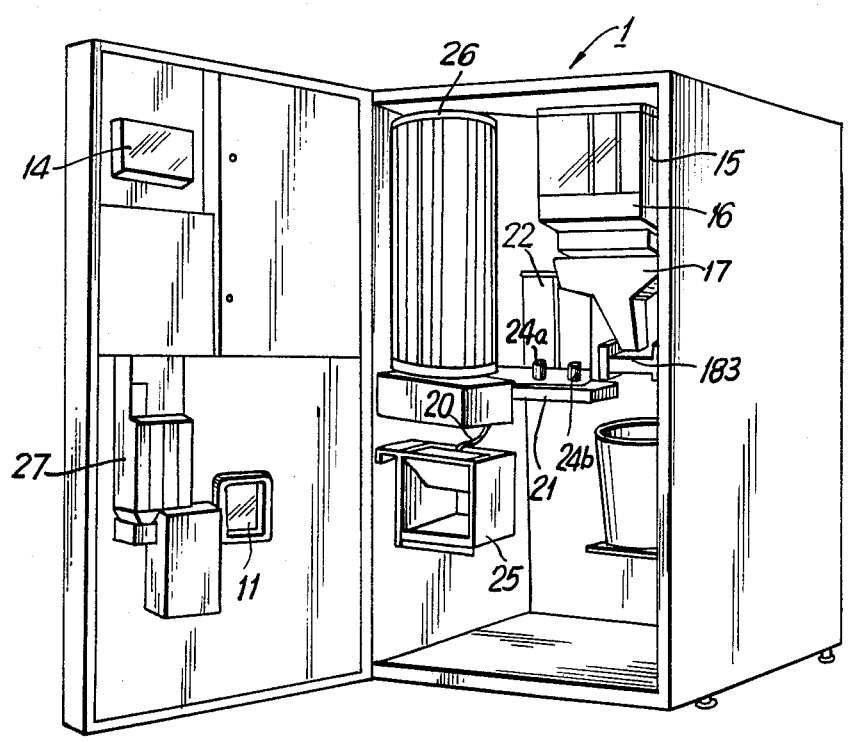
FIG. 2 is a perspective view of the embodiment with a front door being open.
Figure 3:
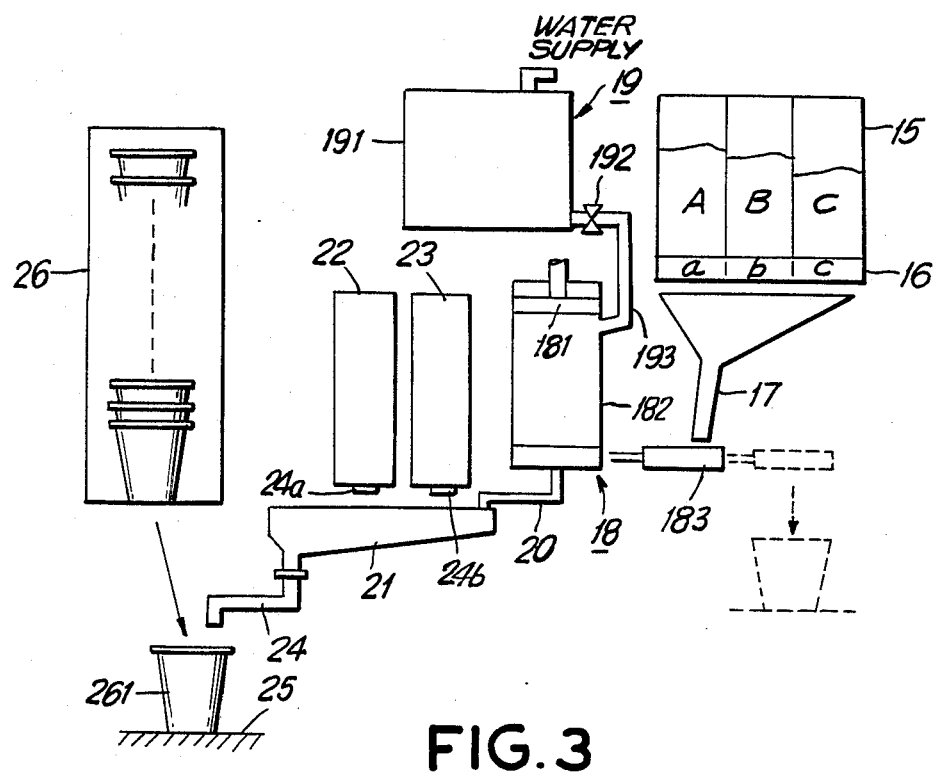
FIG. 3 is a schematic view for illustrating internal devices of the embodiment.

Referring to FIGS. 2 and 3, the vending machine 1 has canister 15 made of a transparent material, in which three varieties of ground coffee powders are contained and are separated from one another by partition walls. Three discharge devices 16a–16c are disposed under the partitioned chambers of canister 15 to discharge coffee powders from the chambers, respectively. The discharge device itself is a conventional one consisting of a motor and a spiral rotated by the motor.

The outlets of three discharge devices 16a–16c are connected with a shooter 17 disposed therebelow, under which is disposed a coffee extractor 18.

Though coffee extractor 18 is well known in the prior art, a particular example will be described with reference to a schematic view of FIG. 3. The coffee extractor includes a cylinder 182 having a piston 181 slidably fitted to move therein up and down, and a movable filter 183 which can move in and out of the lower part of the cylinder. After filter 183 is moved into the lower part of cylinder 182 by a motor, piston 181 descends and then ascends. After the complete descent of piston 181, filter 183 moves away again from the cylinder and stops at its starting position.

The coffee powders are supplied from the shooter 17 onto filter 183 before moving to cylinder 182. Hot water is supplied into cylinder 182 after filter 183 moves into the lower part of cylinder 182 and before or during the piston descending motion. Thus, coffee solution can be extracted and flos through filter 183. The cofee-extracted residue on filter 183 is dropped at a position shown by a broken line into a backet as shown by another broken line. In order to supply hot water to coffee extractor 18, the machine has a hot water supply device 19 consisting of a water heater tank 191 and a hot water supply tube 193 extending therefrom to cylinder 182 through an electromagnetic valve 192.

A coffee-solution supply tube 20 is extended from the lower part of coffee extractor 18 so as to take out the extracted coffee solution, and a mixing trough 21 is disposed at the end of supply tube 20.

The vending machine also has canisters 22 and 23 which stock sugar and cream powder, respectively, to be supplied in accordance with the purchaser's requests. The respective canisters are provided with the corresponding discharge devices (not shown in the drawing), of which the outlets 24a and 24b open onto trough 21. The coffee solution supplied to trough 21 is mixed with sugar and/or cream dropped therein.

A coffee pipe 24 extends from the bottom of trough 21. The vending machine also has a cup supply device 26 which stocks cups, for example paper cups, and supplies one cup for every vending operation onto a cup support stand 25 which is disposed adjacent delivery opening 11. As such a cup supply device of this type is also well know in the prior art, the description thereto is omitted for purpose of simplification of the description. The end of coffee pipe 24 is fixedly disposed above a cup 261 suppliedonto cup support stand 25.

Now, an electric control system of this automatic vending machine will be described with reference to FIG. 4.

Figure 4:
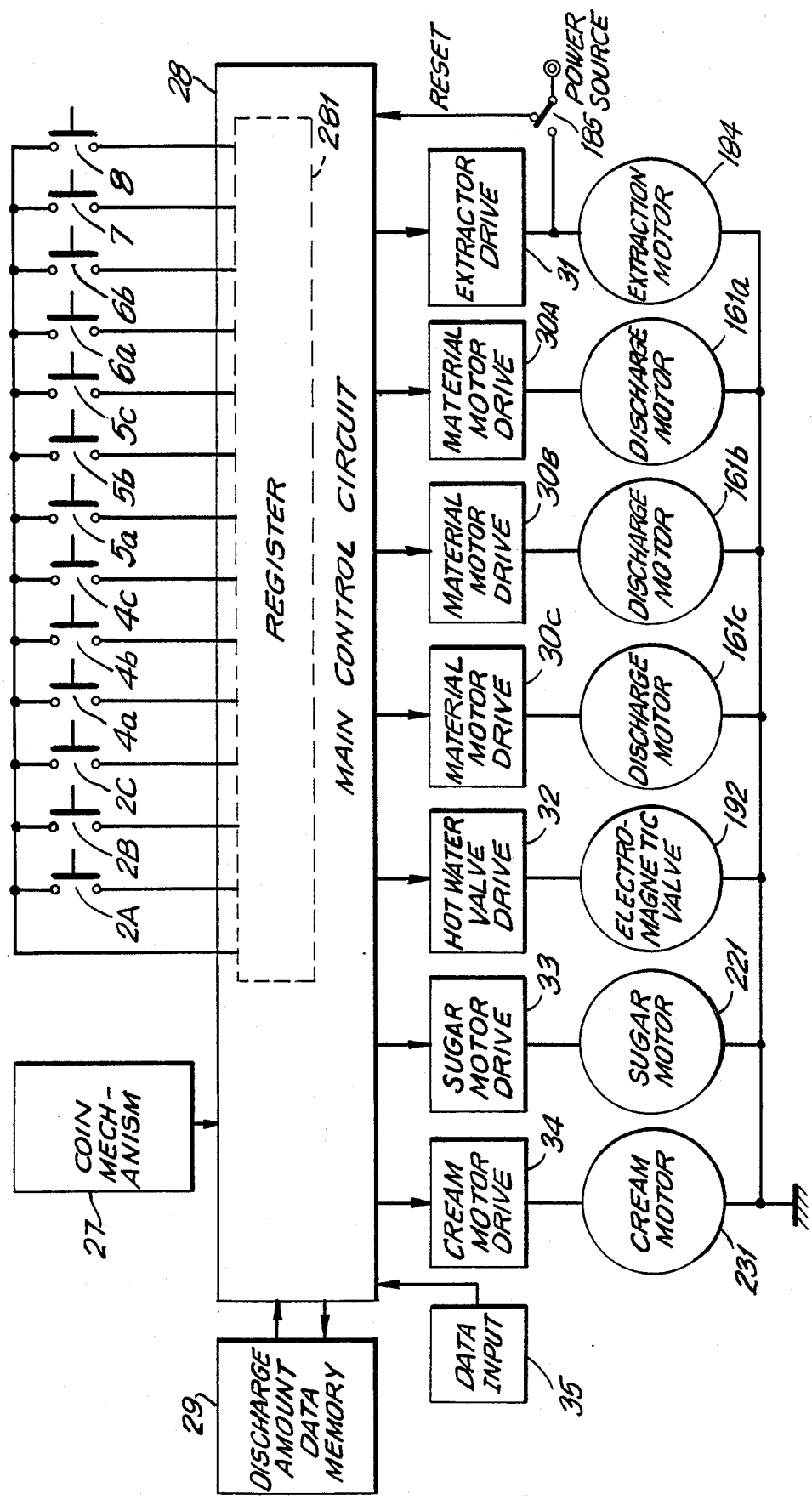
FIG. 4 is a view for illustrating an electric control system of the embodiment.

In FIG. 4, a plurality of switches as shown therein are switch contacts of various keys provided on the machine front face as described hereinbefore and therefore, are designated by the same reference characters as those of the keys in FIG. 1.

A coin mechanism 27 generates a vending signal at a time when amount of the deposited coins becomes equal to or above a predetermined price of the coffee. Such a coin mechanism is also well known in the prior art.

A main control circuit 28 carries out control actions as described later, according to signals from the above-mentioned switches and from the coin mechanism 27. Main control circuit 28 may consist, for example, of a microcomputer or logic circuits.

A discharge amount data memory 29 stores predetermined data for one-time supply amounts of coffee powders, sugar and cream corresponding to the respective selection keys.

Motor driving circuit 30A, 30B and 30C are for driving motors 161a, 161b and 161c of discharge devices 16a–16c. An extractor driving circuit 31 is a circuit for driving a motor 184 to drive the extractor. Once the motor 184 is activated by circuit 31, it continues to rotate until all operaions of the extractor are completed, because a cam switch 185 is turned on. Thereafter, motor 184 stops when cam switch 185 is turned off. A reset signal is transmitted to main control circuit 28 when cam switch 185 is turned off.

A circuit 32 for driving a hot water supply valve 192 controls the open and close operations of electromagnetic valve 192 of hot water supply device 19. Sugar and cream motor driving circuits 33 and 34 serve to drive motors 221 and 231 of sugar and cream disadvantage devices attached to sugar canister 22 and cream canister 23, respectively.

Operation of main control circuit 28 will be described below.

Figure 5:
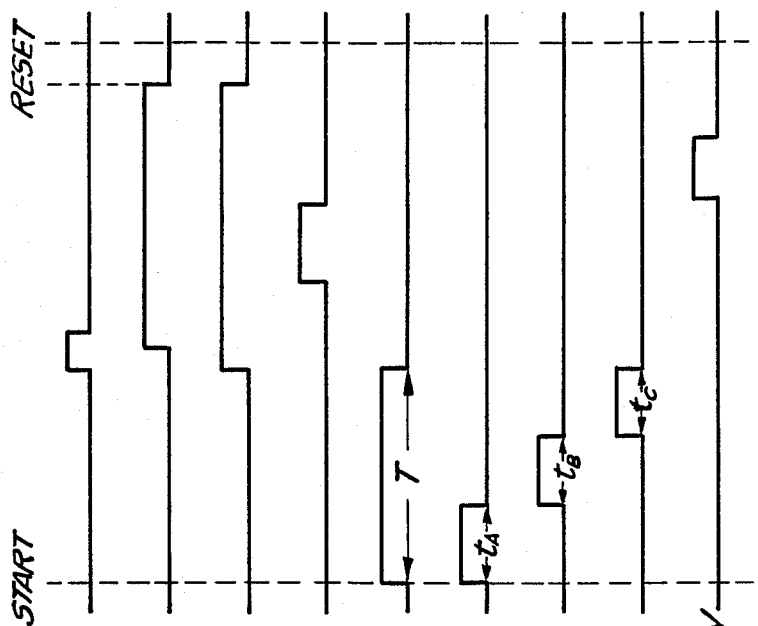
FIG. 5 is a timing chart of various control signals.

Main control circuit 28 is activated on receiving the vending signal from coin mechanism 27 and stores the selection information from selection key switches 2A–2C, 4a–4c, 5a–5c, 6a and 6b into an internal temporary memory or register circuit 281. When the start signal is received from start key switch 8, the supply amounts of coffee powder, sugar and cream are calculated according to the selection information stored in register circuit 281, on the basis of the discharge amount data in memory 29, and the supply amount information is transmitted to motor driving circuits 30A–30C, 33 and 34 of the respective discharge devices, while the actuating signal is transmitted to extractor driving circuit 31 and a valve-opening signal is transmitted to hot water supply valve driving circuit 32. The actuating signal to extractor driving circuit 31, the valve opening signal to electromagnetic valve driving circuit 32, the coffee power supply amount information to motor driving circuits 30A–30C and the sugar and cream supply amount information to motor driving circuits 33 and 34 are sent out at timing relations as shown in FIG. 5.

The data as to the total amount of coffee to be supplied at a vending time; the supply amount ratios of coffee A and B which are predetermined according to selection patterns of straight and blended forms of coffee varieties A–C; and the supply amount of sugar and cream in accordance with the respective selection patterns, are stored in discharge-amount data memory 29. A typical example of the stored data will be shown in the following table.

| Supply amount of coffee powder | | | Supply amounts of cream and sugar | |
|---|---|---|---|---|
| Concentration pattern | Strong Light | W L | Cream | Sugar |
| Varieties | A | B | Selection pattern | |
| Selection pattern | | | Large | CL | SL |
| A | 100(%) | 0(%) | Medium | CM | SM |
| B | 0 | 100 | Small | CS | SS |
| C | 0 | 0 | | |
| A + B | a | b | | |
| A + C | a' | 0 | | |
| B + C | 0 | b' | | |
| A + B + C | a'' | b'' | | |

In the table, W, L, CL, CM, CS, SL, SM and SS represent the predetermined amounts, while a—a'' and b—b'' represent the predetermined percentage ratios (%) to the total amount. The supply amount of coffee C can be obtained by subtracting the values of A and B in the memory from 100%. These data can be written into memory 29 from a data input device 35 through main control circuit 28, and they can be rewritten from data input device 35.

In practical application, the coffee powder supply amount information is given by a time period when a signal is continuously sent out, and therefore is given by a driving time information predetermined in consideraation of a discharging speed of coffee powder discharging device 16. Therefore, if the coffee concentration is the same in the case of selection of any one of coffee varieties, a pulse having a constant time duration is transmitted as shown at (e) in FIG. 5 and motor 161a, 161b or 161c is driven continuously during the pulse exciting time duration.

In selection of a blended coffee, the pulse duration is divided according to the data in memory 29 and pulse signals having the divided time durations are transmitted in sequence to the corresponding motor circuits 30A, 30B, or 30C. Pulse signals to be transmitted to motor driving circuits 30A, 30B and 30C for at a time when all three varieties A, B and C are selected for blending, are shown at (f), (g) and (h) in FIG. 5.

The supply amount information of cream and sugar are also given as time duration of pulse signals to be transmitted from main control circuit 28 to sugar-motor driving circuit 33 and cream-motor driving circuit 34. These two pulse signals indicating the sugar and cream supply amounts can be transmitted at a time or sequentially but should be transmitted so that sugar and cream can be fed into trough 21 at a time just before or after the arrival of the coffee solution extracted at the extractor 18 onto the trough 21, preferably, at a time just after the arrival.

When extracting operation of extractor 18 is completed, main control circuit 28 is reset by the reset signal from cam switch 185 and returns to the initial condition.

Cup supply device 26 is activated to feed a cup 261 on cup support stand 25 is response to the vending signal from coin mechanism 27. It may also be possible to give the actuation signal for cup supply device 26 not directly from coin mechanism 27, but through main control circuit 28 immediately after generation of the start pulse at start key 8.

Figure 6A:
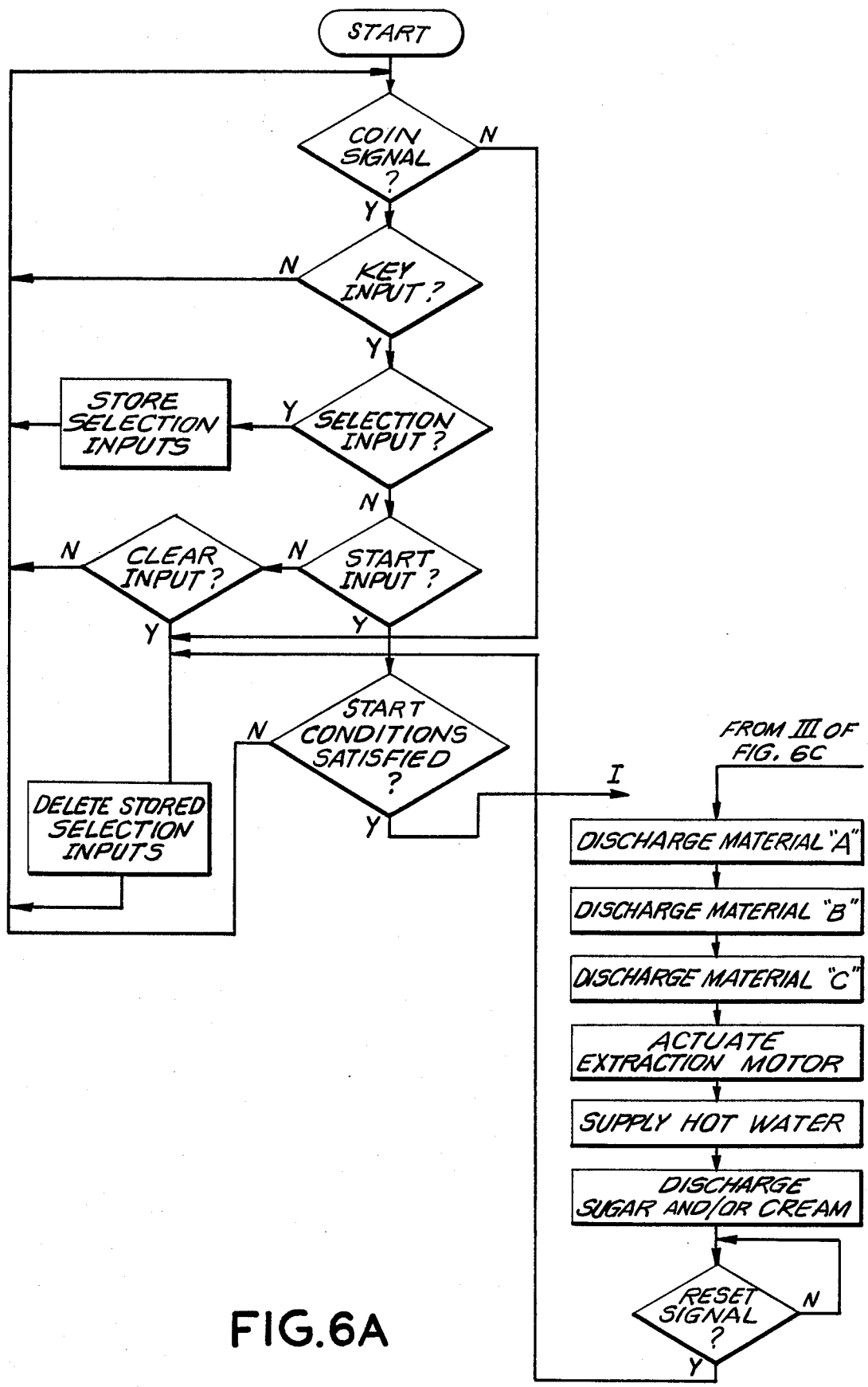
FIGS. 6A–6C are a flow chart illustrating the operation of an electric control means of the embodiment.
Figure 6B:
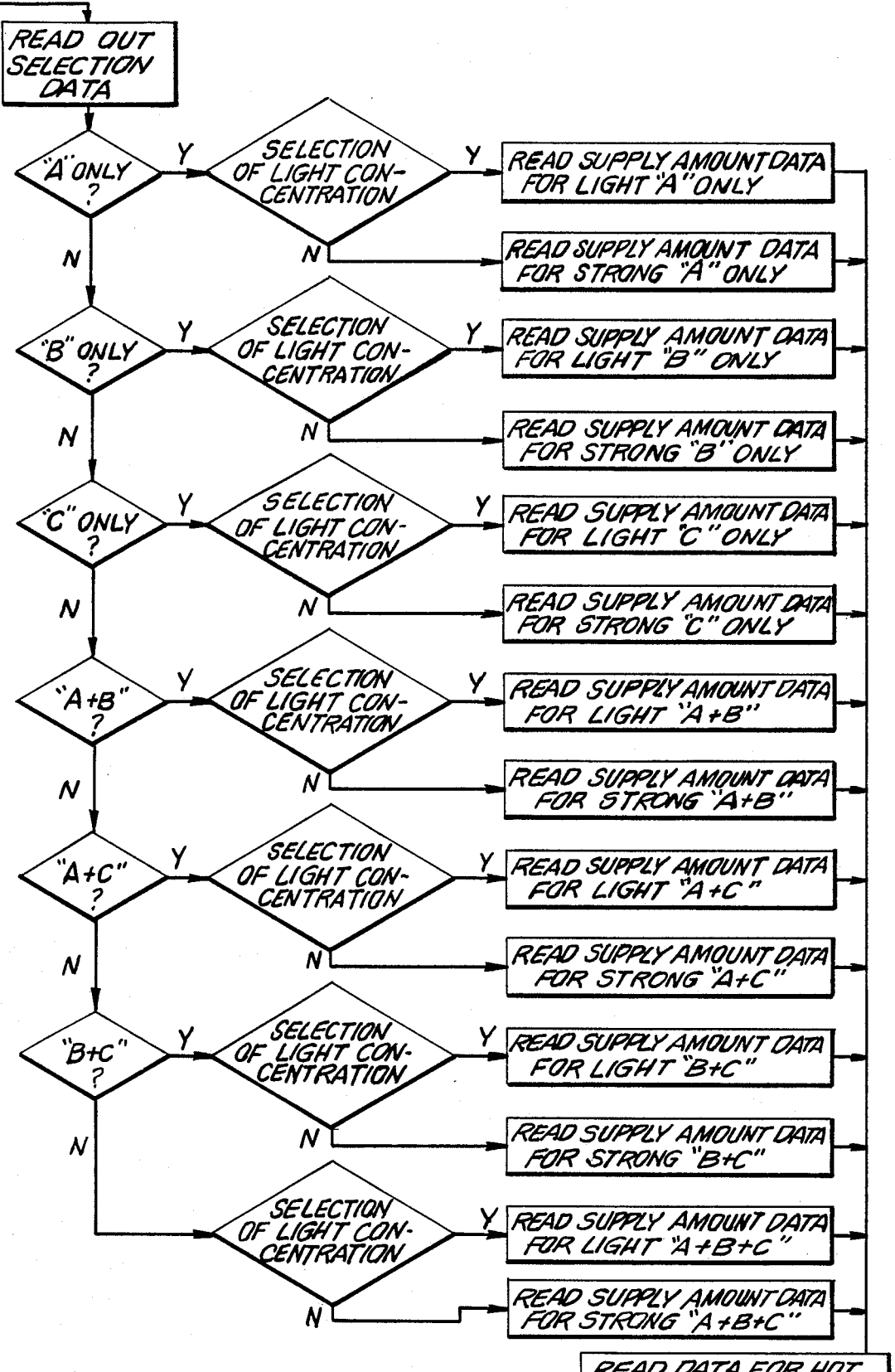
Figure 6C:
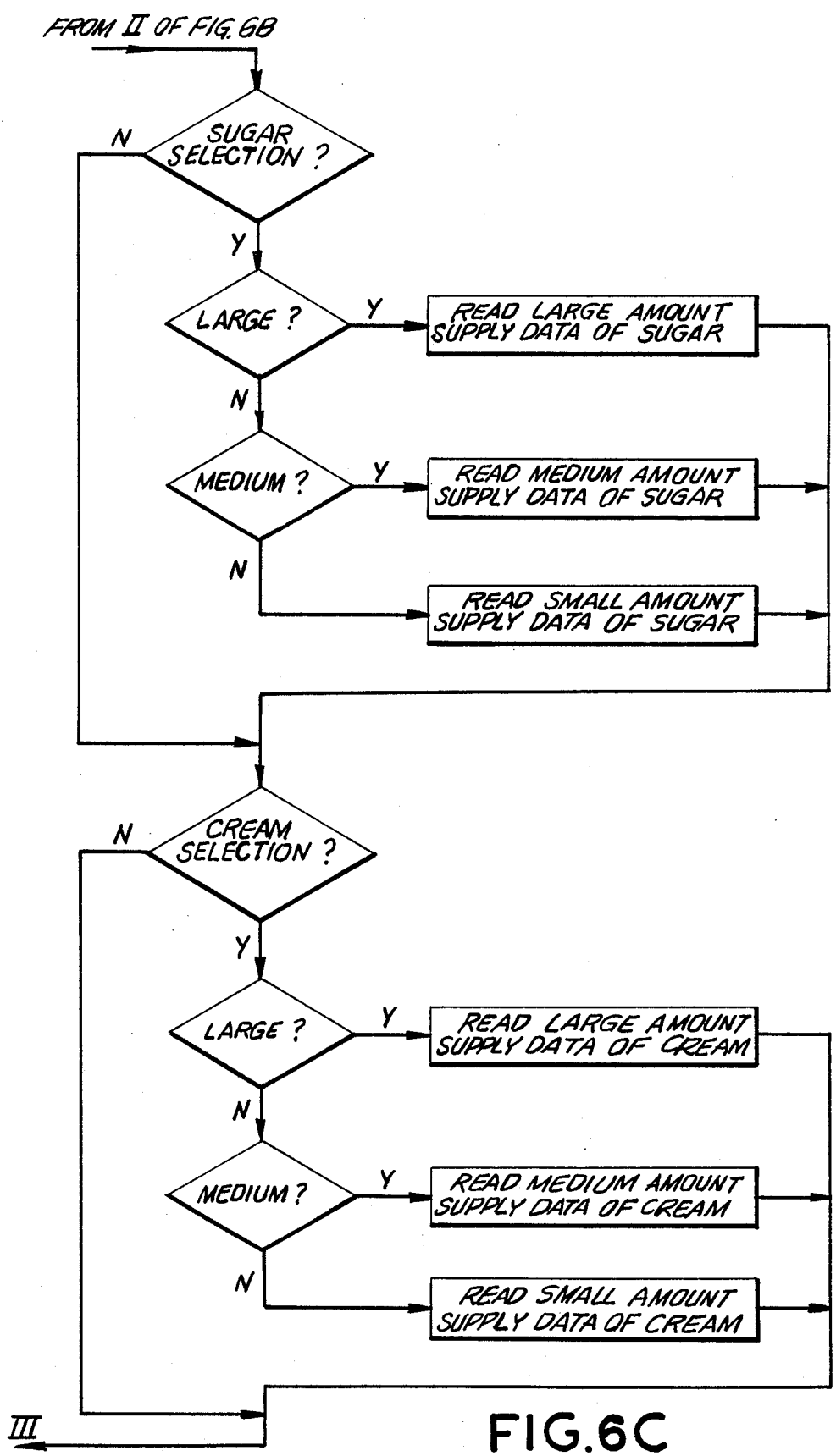

The sequential operations of main control circuit 28 are shown in a flow chart of FIGS. 6A–6C and the operations will be described below with reference to FIGS. 1–6C.

As described above, main control circuit 28 is actuated by the vending signal generated by the coin mechanism at a time when a purchaser deposits coins equal to or above the predetermined price into coin depositing inlet 9, while cup supply device 26 is also actuated by the vending signal to feed a cup 261 onto the cup support stand 25.

When the purchaser pushes one or more keys of coffee powder selection keys 2A–2C, one of sugar amount selection key 4a–4c, one of cream amount selection keys 5a–5c and one of coffee concentration selection keys 6a and 6b, the corresponding information is stored into register circuit 281 under control of main control circuit 28. If the purchaser finds a mis-selection during the above process, he can push clear key 7 first and then selection keys 2, 4, 5 and 6 successively. When clear key 7 is pushed, main control circuit 28 deletes the content of register circuit 281 and waits for new selection information. By way of illustration, supposing that all coffee-powder selection keys 2A–2C were pushed, i.e., the blended coffee A+B+C being requested, that key 6a among coffee concentration selection keys 6 was pushed, i.e. strong coffee being requested and keys 4b and 5b of the sugar- and cream-amount selection keys were pushed, i.e. medium amounts of them being selected, the description will be made below.

When the purchaser, thereafter, pushes start key a, main control circuit 28 reads out the coffee selection information and the concentration information from register circuit 281, and reads out the corresponding coffee supply amount data from memory 29. The supply amounts of selected coffee powders are calculated and the supply amount information is transmitted to coffee-powder-supply motor driving circuit 30. In this case, as the coffee selection information indicates the blend of A+B+C and the concentration information indicates strong coffee, the supply rates a'' and b'' of the coffee varieties A and B for the blend A+B+C among various selection patterns and the total supply amount W among the two concentration patterns are read out from the stored data as shown in the aforementioned table.

Based on the driving time duration T for discharge devices corresponding to the total supply quantity W, main control circuit 28 calculates a driving time duration $t_A = (a''/100) \times T$ of discharge motor 161a corresponding to the A-coffee supply amount A, a driving time duration $t_B = (b''/100) \times T$ of discharge motor 161b and a driving time duration $t_C = T - (a''/100 + b''/100)T$ of the other discharge motor 161c. The pulses having the calculated time durations are sequentially transmitted to the respective motor driving circuits 30A, 30B and 30C (see (f), (g) and (h) in FIG. 5).

As a result, the amounts of $(a''/100)W$, $(b''/100)W$ and $(1-a''-b'')/100)W$ of respective coffee powders of varieties A, B and C in canister 15 are supplied onto the filter 183. After a lapse of time T for transmitting the total supply amount information, main control circuit 28 transmits an actuation signal to extractor driving circuit 31 (see (a) in FIG. 5), which drives in turn the driving motor 184 of the extractor. As a result, cam switch 185 is turned on (see (b) in FIG. 5) and motor 184 thereater rotates continuously (see (c) in FIG. 5). The rotation of extractor driving motor 184 moves filter 183 carrying coffee powders thereon into the lower part of cylinder 182 and then descends piston 183.

Just before or after start of descending of piston 181, main control circuit 28 transmits the hot water supply information to valve driving circuit 32 in order to open electromagnetic valve 192 of hot water supply device 19. The hot water supply information may also be stored in data memory device 29 and be read out at that time.

The hot water supply information is also given as a pulse haing a time duration corresponding to a time period during which electromagnetic valve 192 is open (see (d) in FIG. 5). The time duration is predetermined by taking the hot water supply amount and a supply velocity through the electromagnetic valve into consideration. Therefore, after the predetermined quantity of hot water is supplied into cylinder 182, the coffeesolution is downwardly pushed out through filter 183 by means of the descending of piston 181, and flows into trough 21 through coffee-solution supply tube 20. The coffee solution is feed therefrom into the cup 261 through coffee pipe 24.

After the read out of the data of coffee supply amount, as mentioned above, the supply amount information for sugar and cream (SM, CM in this case) are read out by main control circuit 28 from memory 29 and are transmitted to motor driving circuits 33 and 34 for sugar and cream just before or after the arrival of the coffee solution onto trough 21 (see (i) in FIG. 5). As a result, sugar of SM amount and cream of CM amount are supplied on trough 21 and are mixed with the arriving coffee solution. The mixture is fed into the cup 261.

When piston 181 ascends from its lowest position and returns to its original position, filter 183 returns also to its original position after dropping the extracted residues mentioned before. At that time, cam switch 185 turns off to stop the operation of the extractor, and main control circuit 28 is reset by the turn-off signal to enter the waiting condition for fresh vending service.

Thus, the purchaser can obtain a cup of coffee through delivery opening 11 afrer checking the cessation of coffee flow from the coffee pipe 24. All of the above-mentioned operations refer to the case where all of the selection keys 2 for coffee varieties, and particular selection keys 4, 5 and 6 for sugar, cream and coffee concentration are pushed. It will be easily understood that the similar operation is carried out even when other selection keys are pushed, except for a difference in the pulse widths transmitted to motor driving circuit 30a–30c, 33 and 34 for coffee powder, sugar and cream.

When the purchaser pushes the start switch only, without pushing any one of the selection keys 4 and 5 for sugar and cream, neither is supplied and black coffee is served.

In the above-mentiond embodiment, three selection keys are provided for selecting one of three varieties of coffee. When more than one selection keys 3 are pushed, the coffee varieties corresponding to the pushed keys are blended. However, many modifications can be easily made. In a certain modification, although coffee varieties are selected by the corresponding selection keys only, an additional key is provided to specify the blend. In another modifications, blend selecting key for selecting various but predetermined blends (for example, four keys corresponding to four blends such as A+B, A+C, B+C, A+B+C in the case of three varieties of coffee available)may be provided for the blended coffee selection.

Figure 7:
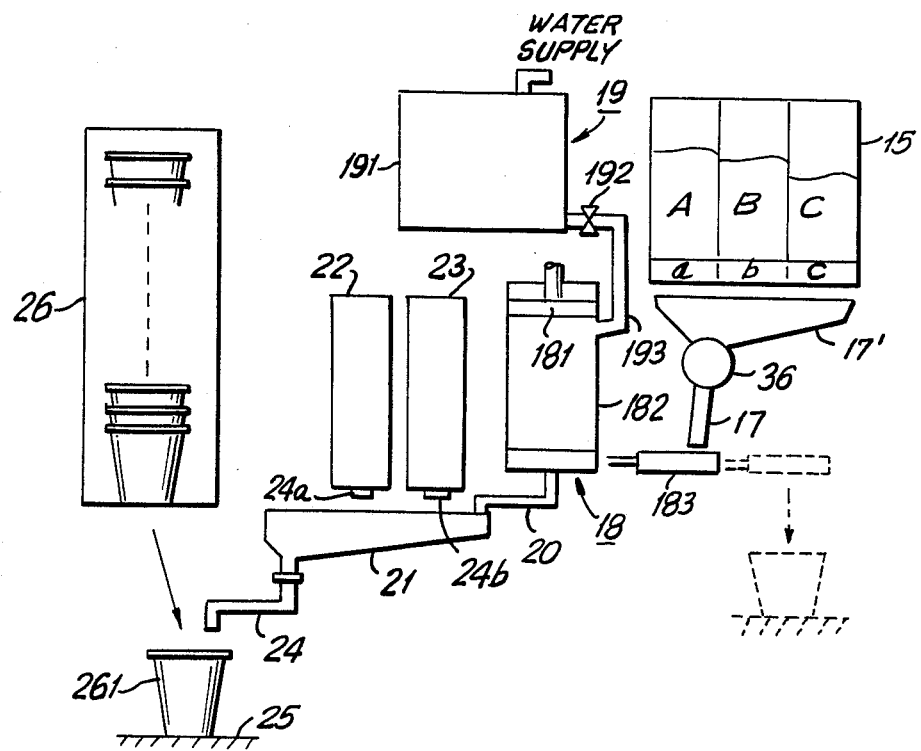
FIG. 7 is a view similar to FIG. 3, but illustrating another embodiment.

In the above embodiment, the coffee canister stores the coffee powders, but it may be possible to charge roasted coffee beans therein. In the case, a coffee mill 36 is disposed below coffee material discharge devices 16a–16c, as shown in FIG. 7. Coffee beans discharged by discharge devices 16a–16c are collected by a shoot 17' and introduced to mill 36. The beans are ground at mill 36 and the ground powder is feed to extractor 18 through a shooter 17. In this case, coffee beans of any one of variety or a plurality of varieties as selected can be ground by a single mill, and the ground powder is fed to extractor 18. It is readily understood that the mill should operate under control of main control means 28.

In FIG. 7, parts except the mill 36 and shoot 17' are similar to those of FIG. 3, and therefore, the similar parts are represented by the same reference characters.

It may be easily understood by those skilled in the art that main control circuit 28 can be composed of a combination of simple registers, readout circuits of memory device 29, processing circuits, timer circuits, and so on.

What is claimed is:

1. An automatic coffee vending machine for dispensing regular brewed coffee comprising:
    a plurality of chambers for storing coffee materials of different varieties, respectively,
    means for transferring coffee materials from each of said plurality of chambers and delivering said coffee materials in controlled proportion to a common coffee extracting means, said coffee materials being delivered to said common coffee extracting means in ground form;
    means for supplying hot water into said common coffee extracting means so as to brew hot coffee from said ground materials;
    trough means for receiving said brewed coffee from said coffee extracting means; said trough means having sugar supply means and cream powder supply means communicating therewith;
    money detecting means for generating a vending signal at a time when an amount of money as deposited is at least equal to a predetermined price;
    selection key means for selecting desirable one or more coffee varieties contained in said plurality of chambers; and
    electric control means beng actuated by said vending signal from said money detection means and controlling said extracting means, said coffee transfer means and said hot water supplying means so as to serve selectively a straight coffee of said desired one variety or a blended coffee of said desired more than one varieties as selected by said selection key means.

2. The automatic coffee vending machine as claimed in claim 1, which further comprises cream selection key, sugar selection key, said electric control means controlling said cream discharging means and said sugar discharge means according to signals from said cream selection key and said sugar selection key so as to supply said cream powder and said sugar in desired preset amounts of each to said trough means, respectively.

3. The automatic coffee vending machine as claimed in claim 1, which further comprises coffee concentration key means for selecting one of different concentration levels, memory means storing data of supply amounts of said coffee materials, said data comprising total supply amounts predetermined according to said different concentration levels, and supply amount rates of said coffee varieties predetermined according to coffee varieties and the number of the varieties by said selection key means, said electric control means reading out said data from said memory means in response to selection signals from said selection key means and said coffee concentraion key means to control transfer of said coffee materials to said coffee extracting means.

4. The automatic coffee vending machine as claimed in claim 1, which further comprises cream amount key means for selecting different supply amounts of cream powders, sugar amount key means for selecting different supply amounts of sugar, memory means storing data of said different supply amounts of cream powder and said different supply amounts of sugar, said electric control means reading out said data from said memory means to control said cream discharge means and said sugar discharge means in response to selection signals from said cream amount key means and said sugar amount key means.

5. The automatic coffee vending machine as claimed in claim 1, wherein said coffee materials stored in said a plurality of chambers are ground coffee powders.

6. The automatic coffee vending machine as claimed in claim 1, wherein said coffee materials stored in said a plurality of chambers are coffee beans, a single coffee mill is disposed to receive coffee beans transferred from said chambers by said transfer means and to grind the received coffee beans.

* * * * *